(12) United States Patent
Lee

(10) Patent No.: US 8,185,098 B2
(45) Date of Patent: May 22, 2012

(54) MOBILE TERMINAL USING VARIABLE MENU ICONS

(75) Inventor: Eun Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 350 days.

(21) Appl. No.: 12/407,603

(22) Filed: Mar. 19, 2009

(65) Prior Publication Data

US 2009/0258638 A1    Oct. 15, 2009

(30) Foreign Application Priority Data

Apr. 10, 2008    (KR) .................. 10-2008-0033249

(51) Int. Cl.
    *H04M 3/00*    (2006.01)
(52) U.S. Cl. ........ 455/418; 455/566; 345/173; 715/702; 715/765
(58) Field of Classification Search .................. 455/418, 455/456.1, 456.5, 566, 67.7, 67.11; 345/173; 715/702, 765, 814, 823
    See application file for complete search history.

(56) References Cited

U.S. PATENT DOCUMENTS

| | | | |
|---|---|---|---|
| 2008/0174568 A1* | 7/2008 | Kim | 345/173 |
| 2008/0259045 A1* | 10/2008 | Kim et al. | 345/173 |
| 2009/0005018 A1* | 1/2009 | Forstall et al. | 455/414.1 |
| 2010/0004005 A1* | 1/2010 | Pereira et al. | 455/457 |
| 2011/0092255 A1* | 4/2011 | Igor et al. | 455/566 |

* cited by examiner

*Primary Examiner* — Cong Tran
(74) *Attorney, Agent, or Firm* — KED & Associates, LLP

(57) ABSTRACT

A method for controlling a mobile terminal includes setting a variable menu icon to represent different functions for first and second operating modes, displaying a plurality of menu icons including the variable menu icon during the first operating mode, and switching the variable menu icon from a function different from a previous function of the variable menu icon during the first operating mode when the mobile terminal changes from the first operating mode to the second operating mode. The other menu icons may be controlled to maintain previous functions that they assumed during the first operating mode after the function of the variable menu icon is switched.

19 Claims, 10 Drawing Sheets

MOBILE TERMINAL USING VARIABLE MENU ICONS

CROSS-REFERENCE TO RELATED APPLICATION

This application claims priority to Korean Patent Application No. 10-2008-0033249 filed on Apr. 10, 2008 in Korea, the disclosure of which is incorporated herein by reference.

BACKGROUND

1. Field

One or more embodiments described herein relate to communication terminals.

2. Background

Mobile terminals and other portable communication devices with increased functionality are constantly evolving. Recently, mobile terminals with touch screens have garnered favor with many consumers. These terminals display virtual keypads that allow users to control complex services and terminal applications with relative ease. However, there is a trade off between screen size and mobility, i.e., larger screens allow for increased functionality, but care must be taken not to make the screens too large or the terminals may become too cumbersome to carry or inconvenient for portable use. A need therefore exists for improvements in the display of information and control of mobile terminals and other portable devices.

BRIEF DESCRIPTION OF THE DRAWINGS

The embodiments will be described in detail with reference to the following drawings in which like reference numerals refer to like elements wherein.

DETAILED DESCRIPTION

Figure 1:
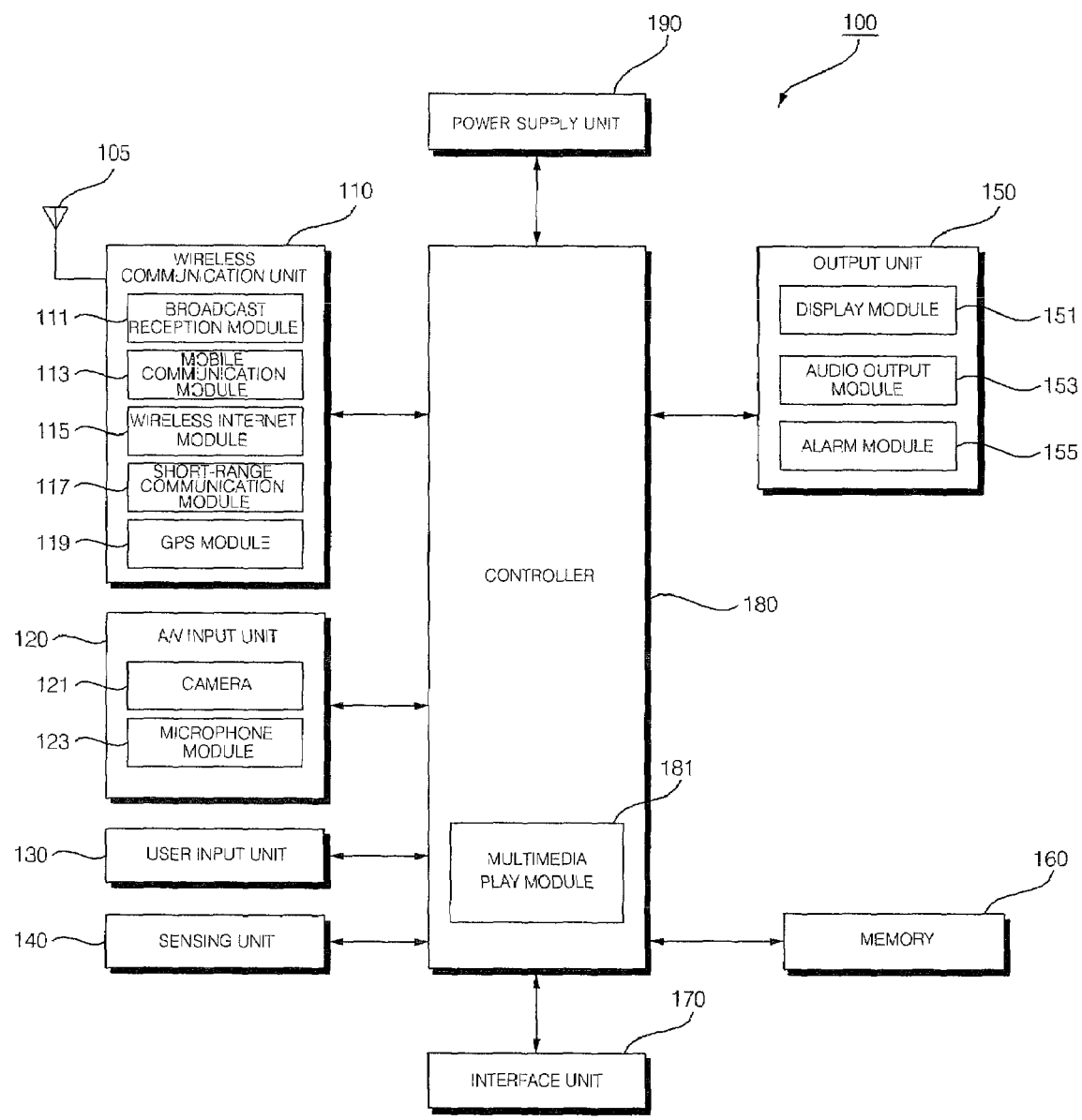
FIG. 1 is a functional block diagram of one embodiment of a mobile terminal.

FIG. 1 is a functional block diagram of one embodiment of a portable communication device 100, which, for example, may be a mobile terminal. The mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Two or more of these units may be incorporated into a single unit, or two or more of the units may be divided into two or more smaller units. Various other internal arrangements are possible.

The wireless communication unit 110 may include a broadcast reception module 111, a mobile communication module 113, a wireless Internet module 115, a short-range communication module 117, and a global positioning system (GPS) module 119, or any combination thereof.

The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates and transmits broadcast signals and/or broadcast-related information, or one that receives and transmits previously-generated broadcast signals and/or broadcast-related information.

Examples of the broadcast-related information include broadcast channel information, broadcast program information and broadcast service provider information. Examples of broadcast signals include TV broadcast signals, radio broadcast signals, data broadcast signals, or a combination of data broadcast signals and either TV broadcast signals or a radio broadcast signals.

The broadcast-related information may be provided to the mobile terminal through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) or electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module may be configured to be suitable for nearly all types of broadcasting systems other than the examples specifically discussed herein.

The broadcast signal and/or broadcast-related information received by the broadcast reception module may be stored in memory 160.

The mobile communication module 113 transmits wireless signals to and/or receives wireless signals from at least one of a base station, an external terminal, or a server through a mobile communication network. The wireless signals may include various types of data based on, for example, whether the mobile terminal transmits/receives voice call signals, video call signals, or text/multimedia messages.

The wireless Internet module 115 wirelessly accesses the Internet and may be embedded in the mobile terminal or may be installed in an external device.

The short-range communication module 117 provides short-range communication using various communication techniques or protocols such as Bluetooth, radio frequency identification (RFID), infrared data association (IrDA), ultra wideband (UWB), and ZigBee.

The GPS module 119 may receive position information from a plurality of GPS satellites.

The A/V input unit 120 may receive audio signals and/or video signals. According to one embodiment, the A/V input unit includes a camera 121 and microphone module 123. The camera may process image frames (such as still images or moving images) captured, for example, by an image sensor during a video call mode or image capturing mode. The image frames processed by the camera may be displayed by a display module 151. Also, the image frames processed by the camera may be stored in memory 160 or may be transmitted outside the mobile terminal through, for example, the wireless communication unit 110. If desired, the mobile terminal may have two or more cameras.

The microphone module 123 receives external sound signals during a call mode, a recording mode, and/or a voice recognition mode through a microphone. The sound signals are then converted to electrical sound data. In call mode, mobile communication module 113 may convert the sound data into data that can be readily transmitted to a mobile communication base station and then output the data obtained from a conversion. The microphone module may use various noise removal algorithms to remove noise that may be generated during the reception of external sound signals.

The user input unit 130 generates key input data based on user input for controlling the operation of the mobile terminal. The user input unit may be implemented as a keypad, a dome switch, a touch pad (either static pressure or constant electricity), a jog wheel, a jog switch, or any combination of these. If the user input unit is a touch pad and forms a mutual layer structure with the display module 151, the user input unit and display module 151 may be collectively referred to as a touch screen.

The sensing unit 140 determines a current state of the mobile terminal such as whether the mobile terminal is opened or closed, the position of the mobile terminal, and whether the mobile terminal is placed in contact with a user. The sensing unit 140 may also generate one or more sensing signals for controlling operation of the mobile terminal. For example, when the mobile terminal is a slide-type mobile phone, the sensing unit 140 may determine whether the terminal is opened or closed. In addition, the sensing unit 140 may determine whether the terminal is powered by power supply unit 190 and whether the interface unit 170 is connected to an external device.

The output unit 150 may output audio signals, video signals, and alarm signals. The output unit may include display module 151, an audio output module 153, and/or an alarm module 155.

The display module 151 may display various forms of information processed by the mobile terminal. For example, if the mobile terminal is in call mode, the display module may display a user interface (UI) or a graphic user interface (GUI) for making or receiving a call. If the mobile terminal is in video call mode or image capturing mode, the display module may display a UI or a GUI for capturing or receiving images.

If the display module and user input unit 130 form a mutual layer structure and are thus implemented as a touch screen, the display module may be used not only as an output device but also as an input device. When the display module is implemented as a touch screen, the display module may also include a touch screen panel and a touch screen panel controller. The touch screen panel may be a transparent panel attached to the exterior of the mobile terminal and may be connected to an internal bus of the mobile terminal.

The touch screen panel monitors whether the touch screen panel is touched by a user. Once a touch input to the touch screen panel is detected, the touch screen panel transmits a number of signals corresponding to the touch input to the touch screen panel controller. The touch screen panel controller then processes the signals transmitted by the touch screen panel, and transmits the processed signals to the controller 180. The controller 180 determines whether a touch input has been generated and which part of the touch screen panel has been touched based on the processed signals transmitted by the touch screen panel controller.

As previously described, if the display module and user input unit form a mutual layer structure and are thus implemented as a touch screen, the display module may be used not only as an output device but also as an input device. The display module may include at least one of a liquid crystal display (LCD), a thin film transistor (TFT)-LCD, an organic light-emitting diode (OLED), a flexible display, or a three-dimensional (3D) display. As previously indicated, the mobile terminal may include two or more display modules. The mobile terminal may include an external display module (not shown) and an internal display module (not shown).

The audio output module 153 may output audio data received by wireless communication unit 110 during a call reception mode, call mode, recording mode, voice recognition mode, or broadcast reception mode or may output audio data present in memory 160. In addition, the audio output module may output various sound signals associated with functions of the mobile terminal such as receiving a call or a message. Also, the audio output module may include a speaker and/or a buzzer.

The alarm module 155 may output an alarm signal indicating the occurrence of an event in the mobile terminal. Examples of an event include receiving a call signal, receiving a message, and receiving a key signal. Examples of the alarm signal output by the alarm module include an audio signal, a video signal and a vibration signal. The alarm module may also output a vibration signal upon receiving a call signal or message. In addition, the alarm module may receive a key signal and may output a vibration signal as feedback to the key signal. Once a vibration signal is output by the alarm module, the user may recognize that an event has occurred. A signal for notifying the user of the occurrence of an event may be output by the display module or the audio output module, or both.

The memory 160 may store various programs necessary for the operation of the controller 180. In addition, the memory may temporarily store various types of data such as phonebook data, messages, still images, and/or moving images.

The memory may be a flash memory, a hard disk type storage medium, a multimedia card micro type storage medium, a card type memory (e.g., a secure digital (SD) or extreme digital (XD) memory), a random access memory or a read-only memory (ROM). The mobile terminal may operate a web storage which performs the functions of the memory on the Internet.

The interface unit 170 may interface with an external device that can be connected to the mobile terminal. The interface unit may, for example, be a wired/wireless headset, an external battery charger, a wired/wireless data port, a card socket (e.g., for a memory card or for a subscriber identification module (SIM)/user identity module (UIM) card), an audio input/output (I/O) terminal, a video I/O terminal, or an earphone. The interface unit may receive data from the external device and/or may be powered by the or another external device. The interface unit may transmit data provided by the external device to other components in the mobile terminal, and/or may transmit data provided by other components in the mobile terminal to an external device.

The controller 180 may control general operation of the mobile terminal. For example, the controller may perform various control operations related to making/receiving voice calls, transmitting/receiving data, or making/receiving video calls. The controller may include a multimedia play module 181 for playing multimedia data. The multimedia play module may be implemented as a hardware device installed in the controller or another part of the mobile terminal. Alternatively, the multimedia play module may be implemented as a software program.

The power supply unit 190 is supplied with power by an external power source or an internal power source and supplies power to other components in the mobile terminal.

The mobile terminal 100 may also include a wired/wireless communication system and a satellite-based communication system. The mobile terminal may be configured to operate in a communication system transmitting data as frames or packets.

The exterior of the mobile terminal will hereinafter be described in detail with reference to FIGS. 2 and 3. For convenience, it is assumed that the mobile terminal is a slide-type mobile phone. However, the embodiments described herein may just as easily be applied to other types of mobile phones/terminals, such as but not limited to folder-type phones/terminals.

Figure 2:
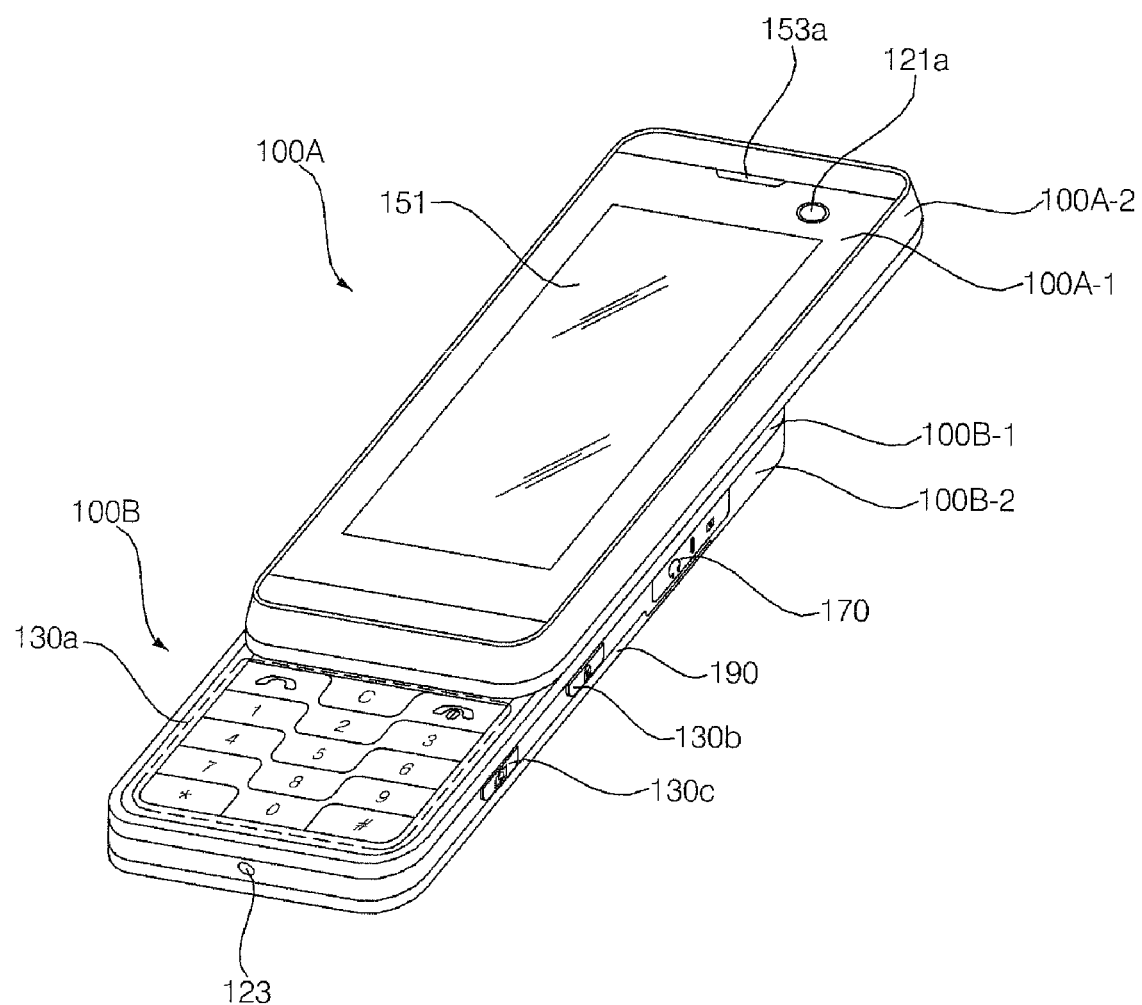
FIG. 2 is a diagram showing a front view of the mobile terminal of FIG. 1.

FIG. 2 shows a front view of the mobile terminal. terminal which includes a first body 100A and a second body 100B which is configured to slide in at least one direction along the first body 100A.

When the first body overlaps the second body, the mobile terminal 100 is considered to be a closed state. And when the first body is in a position where at least part of the second body is exposed, the mobile terminal is considered to be in an open state.

When the mobile terminal is closed, the mobile terminal generally operates in standby mode and may be manually released from the standby mode by a user. When the mobile terminal is opened, the mobile terminal generally operates in a call mode and may be placed in standby mode either manually by a user or automatically after a predetermined amount of time has elapsed.

The first body 100A may include a first front case 100A-1 and a first rear case 100A-2, which form the exterior of the first body. Various electronic products may be installed in an empty space between the first front case and the first rear case. At least one intermediate case may be additionally disposed between the first front and rear cases.

The first front case and first rear case may be formed of synthetic resin through injection molding, or may be formed of a metal such as stainless steel (STS) or titanium (Ti).

The display module 151, a first sound module 153a and a first camera 121a may be disposed in first body 100A, and particularly in the first front case 100A-1. The display module may include an LCD or an OLED which visually represents information. A touch pad is configured to overlap the display module to form a layered structure that operates as a touch screen. It is therefore possible for a user to input information to the display module simply by touching the display module. The first sound module 153a may be a receiver or a speaker, and the first camera may be configured to capture still or moving images.

The second body 100B may include a second front case 100B-1 and a second rear case 100B-2 which form an exterior of the second body. A first user input module 130a may be disposed at the front of the second body, and particularly at the front of the second front case. Second and third user input modules 130b and 130c, microphone 123 and interface unit 170 may be disposed in the second front case or in the second rear case.

The first through third user input modules 130a through 130c may be collectively referred to as user input unit 130. The user input unit may adopt various manipulation methods as long as it can offer tactile feedback to a user. For example, the user input unit may be implemented as a dome switch or a touch pad which receives a command or information upon being pushed or touched by a user. Alternatively, the user input unit may be implemented as a wheel, a jog dial, or a joystick.

The first user input module 130a may allow a user to input commands such as 'start', 'end', and 'scroll', numbers, characters or symbols. The second and third user input modules 130b and 130c may also serve as hot keys for activating certain functions of the mobile terminal.

The microphone 123 may be configured to receive the voice of a user or other sounds. and may serve as a path for allowing the mobile terminal to exchange data with an external device. For example, the interface unit may be a connection terminal for connecting an earphone to the mobile terminal in a wired or wireless manner, a port for short-range communication, or a power supply terminal for supplying power to the mobile terminal.

The interface unit may be a SIM or a UIM or may be a card socket for an exterior-type card such as a memory card for storing data.

The power supply unit 190 may be disposed in second rear case 100B-2 and may be a rechargeable battery coupled to the second body so as to be able to be attached to or detached from the second body.

Figure 3:
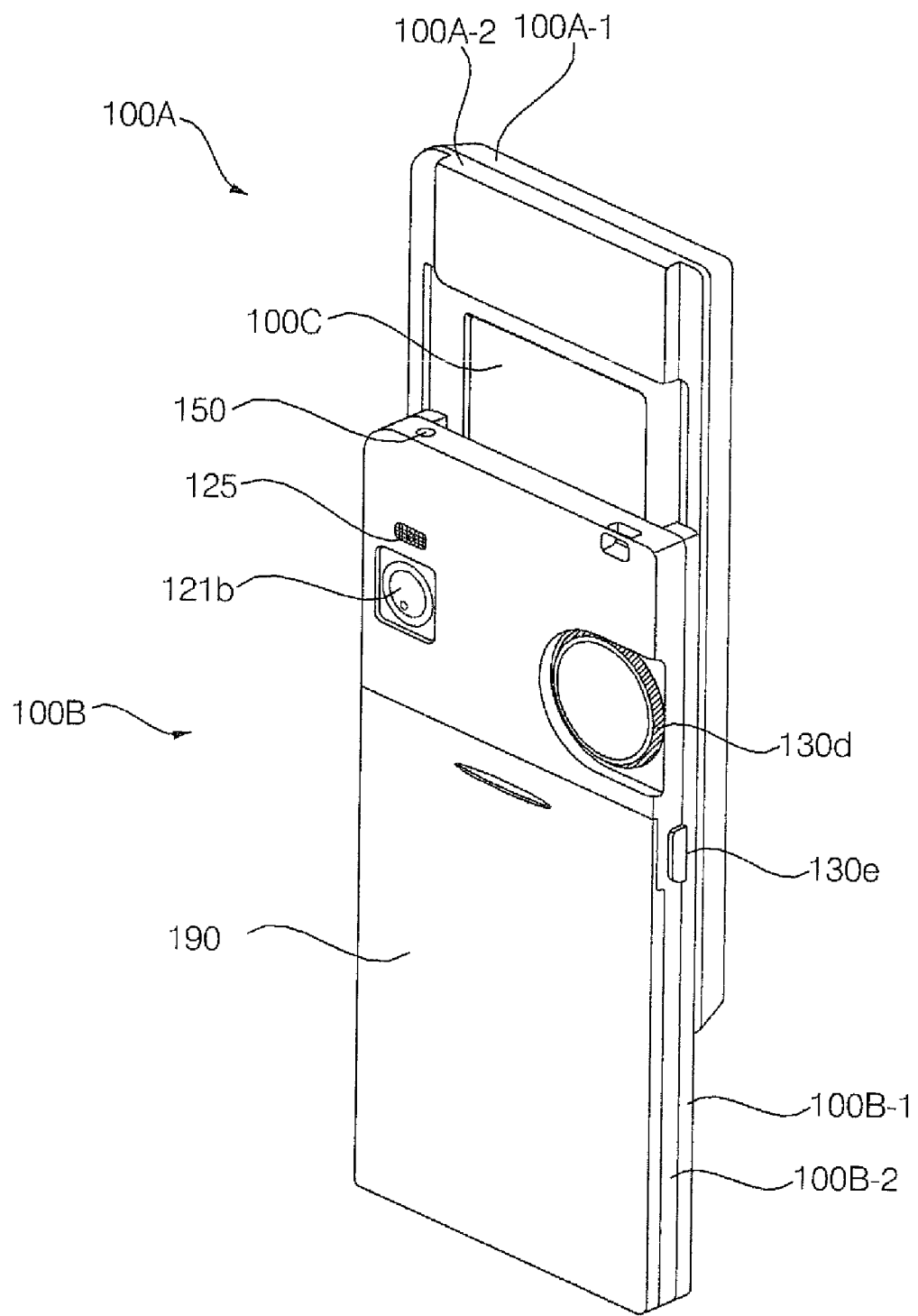
FIG. 3 is a diagram showing a rear view of the mobile terminal of FIG. 1.

FIG. 3 shows a rear view of the mobile terminal 100, which includes a fourth user input module 130d and a second camera 121b disposed at the rear of second rear case 100B-2 of second body 100B. The fourth user input module may, for example, be a wheel-type module and a fifth user input module 130e may be disposed on a lateral side of second body 100B. The second camera may have a different photographing direction from the first camera, and the pixel resolution of the second camera may be the same or different from the first camera.

For example, first camera 121a may be used to capture an image of the face of a user and then readily transmit the captured image during a video call. Thus, the first camera may be a low-pixel camera. The second camera 121b may be used to capture an image of an ordinary subject. Because images captured by the second camera may not need to be transmitted, the second camera may be a high-pixel camera.

A camera flash 125 and a mirror (not shown) may be disposed near the second camera. The flash is used to illuminate a subject to allow the second camera to capture an image of the subject with greater quality and clarity. A user of the terminal may look in the mirror for taking a self shot.

A second audio output module (not shown) may be additionally provided in the second rear case 100B-2. The second audio output module may realize a stereo function along with the first audio output module 153a. The second audio output module may also be used during a speaker-phone mode.

An antenna (not shown) for receiving a broadcast signal may be disposed on one side of second rear case 100B-2. The antenna may be installed so as to be able to be pulled out from second body 100B-2.

A slider module may be disposed on first rear case 100A-2 of the first body. The slider module may be coupled to the first body 100A and second body 100B so that the first body can slide along the second body. The slider module may be partially exposed by second front case 100B-1.

The second camera 121b is shown in FIG. 3 as being disposed on second body 100B, but the second camera may be provided at other locations of the terminal if desired. For example, at least one of the antenna, second camera 121b or camera flash 125 may be mounted on first body 100A and particularly first rear case 100A-2 of the first body. In this case, whichever of the antenna, second camera and/or camera flash is mounted on first rear case 100A-2 may be protected by second body 100B when the mobile terminal is closed. The first camera may be able to rotate and thus to cover the photographing direction of the second camera. In this case, the second camera may be an optional feature. Also, while the second camera shown as being disposed in rear case 100A-2, in other embodiments the second camera may be provided at different locations.

Figure 4:
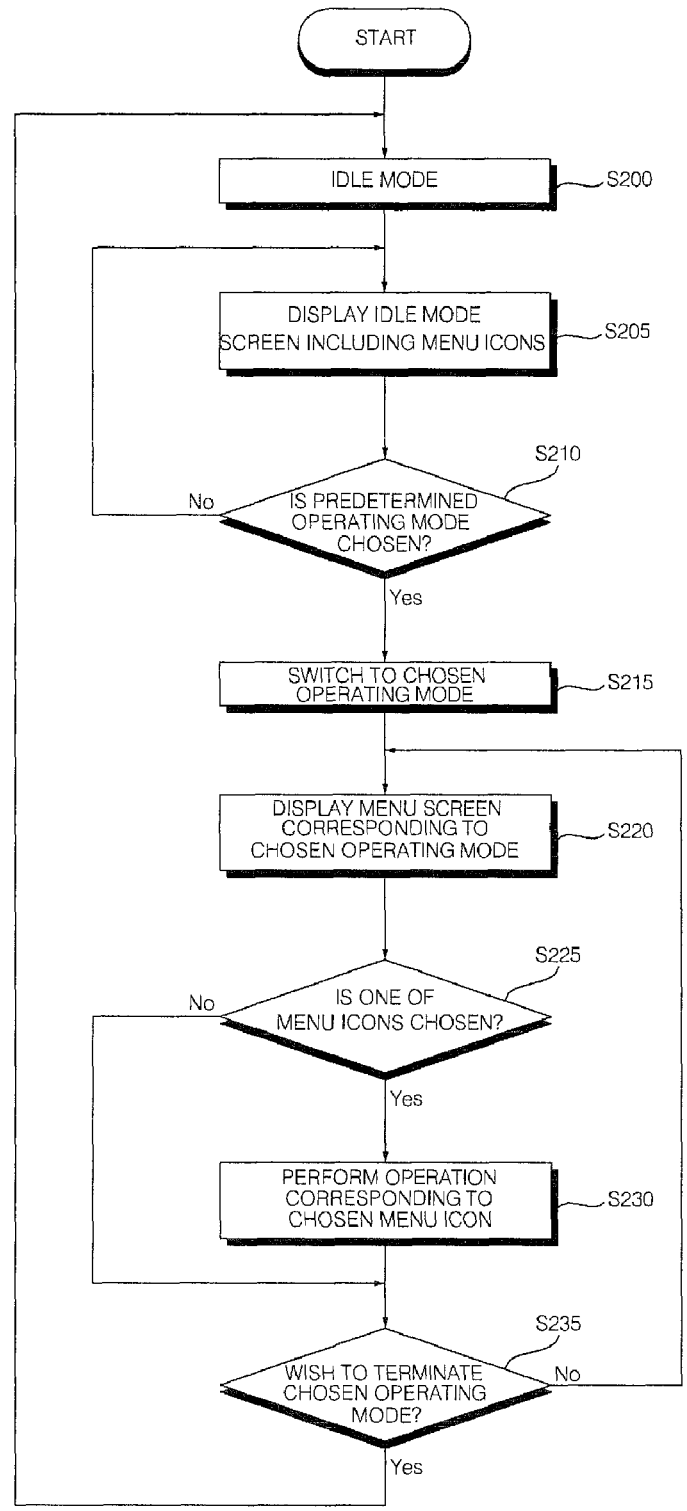
FIG. 4 is a diagram showing steps included in one embodiment of a method for controlling a mobile terminal.
Figure 5:
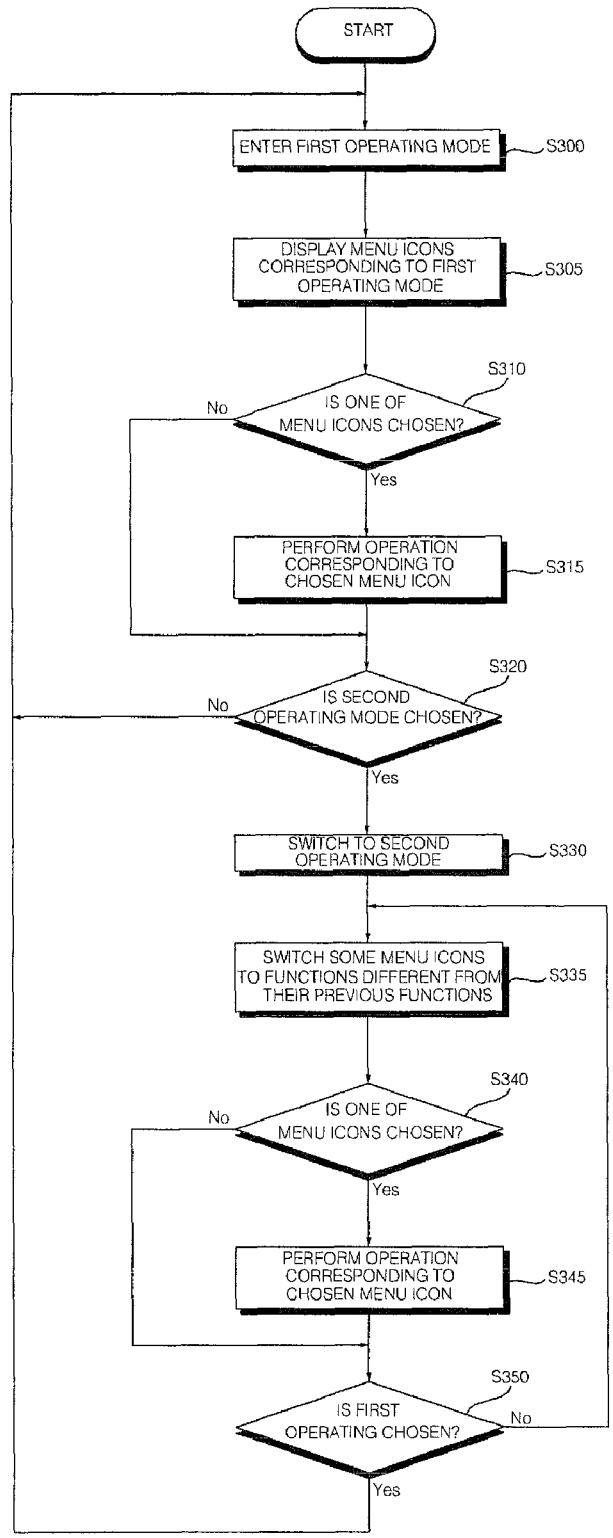
FIG. 5 is a diagram showing steps included in the same or another embodiment of a method for controlling a mobile terminal.

FIGS. 4 and 5 show operations included in various embodiments of a method for controlling a mobile terminal, which, for example, may be the terminal shown in FIGS. 1-3 discussed above. Referring to FIG. 4, when the mobile terminal is placed in idle mode and thus is able to receive, for example, a user command (S200), an idle mode screen including a number of menu icons may be displayed on a screen of display module 151 (such as a touch screen) under control of the controller 180 (S205). Each of the menu icons may be chosen in response to a touch input or a key input received from user input unit 130 and may perform one or more predefined operations or functions.

In order to reduce power consumption, the touch screen may be automatically turned off if a touch input or a key input is not received within a predefined amount of time. Thereafter, if a touch or key input is received through user input unit 130, the touch screen on which the idle mode screen is displayed may be turned back on. Also, if first body 100A is slid up or a key input is received through the user input unit in standby mode for exchanging signals with a base station when the display module is turned off, display module 151 may be turned on and the mobile terminal may be placed in the idle mode. Then, the mobile terminal may receive a user command with the display module turned on.

If a predetermined operating mode such as a multitasking mode is chosen when the mobile terminal is in idle mode (S210), controller 180 may place the mobile terminal in a chosen operating mode (S215). The multitasking mode is an operating mode during which two or more tasks or programs can be executed at the same time. Thereafter, the controller may control the display module to display an operation screen corresponding to the chosen operating mode (S220).

At least one of the menu icons previously displayed on the idle mode screen may a variable menu icon. Variable menu icons may switch from one function to another and therefore may represent more than one function according to the operating mode of the mobile terminal, whereas functions represented by typical menu icons may never change regardless of the operating mode of the mobile terminal. Variable menu icons may be set in advance through user setting in response to a user command or through a default setting.

When a variable menu icon is switched from one function to another function, an animation effect for displaying the variable menu icon to be flipped over may be applied to the variable menu icon, so that a user can easily recognize the variable menu icon and the change of function of the variable menu icon. Alternatively, a sound effect or a haptic effect such as vibration may be applied to the variable menu icon in order for the user to recognize the variable menu icon and the change of function of the variable menu icon.

If one of a plurality of menu icons displayed corresponding to the chosen operating mode is selected in response to a touch or key input (S225), the controller may control an operation of the terminal corresponding to the selected menu icon (S230). Alternatively, if one of a plurality of menu items is chosen from the operation screen corresponding to the chosen operating mode, the controller may control an operation corresponding to the selected menu item. If a user wishes to terminate the operation corresponding to the selected menu icon (S235), the method returns to operation S200 and thus the mobile terminal may be placed back in the idle mode. On the other hand, if the user wishes not to terminate the operation corresponding to the selected menu icon, the method returns to operation S220.

In this manner, it is possible for a touch screen with a limited size to provide various operations or functions, by displaying variable menu icons that are capable of switching from one function to another function according to the operating mode of a mobile terminal.

FIG. 5 shows operations included in another embodiment of a method for controlling the mobile terminal. This embodiment focuses on the use of variable menu icons in various operating modes, other than idle mode. When the mobile terminal is placed in a first operating mode in response to a user command (S300), the controller may control the display module to display a number of menu icons corresponding to the first operating mode (S305).

If one of the menu icons is chosen (S310), the controller may control an operation corresponding to the chosen menu icon to be performed (S315). Thereafter, if a second operating mode is chosen (S320), the controller may place the mobile terminal in the second operating mode (S330) and may control some of the menu icons (e.g., a number of variable menu icons) to switch to functions different from their previous functions during the first operating mode (S335). This may be understood to involve, for example, a change of the functions and also images of whichever ones of the menu icons displayed in operation S305 are variable menu icons.

Thereafter, if one of the menu icons or one of a plurality of menu items is chosen (S340), the controller may control an operation corresponding to the chosen menu icon or the chosen menu item to be performed (S345). If the first operating mode is chosen again (S350), the method returns to operation S300 so that the mobile terminal can be placed back in the first operating mode (S300). On the other hand, if the first operating mode is yet to be chosen again, the method returns to operation S335. In this manner, it is possible to use variable menu icons even when the mobile terminal switches between various operating modes, other than the idle mode.

Figure 6:
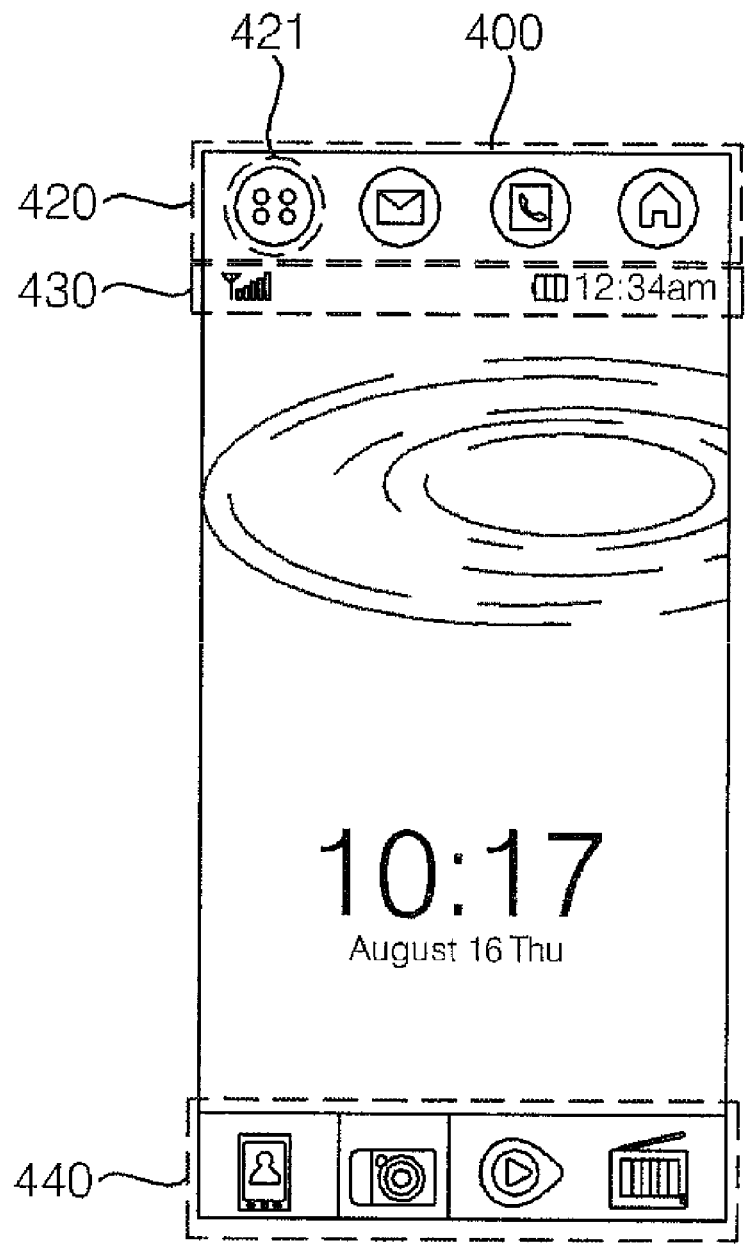
FIGS. 6 through 10 show examples of display screens and menus that may be used to implement one or more steps of the methods of FIGS. 4 and/or 5.

FIGS. 6 through 10 show examples of screens that may be used to explain various steps of the methods shown in FIGS. 4 and 5. More specifically, FIG. 6 shows a screen 400 that may be displayed in idle mode. A plurality of menu icons 420 may be displayed at the top of this screen for choosing, for example, a main menu, a message menu, or a call menu. A plurality of indicator icons 430 may also be displayed below menu icons 420 for indicating received signal intensity, remaining battery power, and/or current time information. A predetermined background image may be displayed on the idle mode screen, and a plurality of additional menu icons 440 may be displayed at the bottom of the screen for choosing a camera function or a video call function, accessing the Internet or watching digital multimedia broadcasting (DMB) programs.

Figure 7:
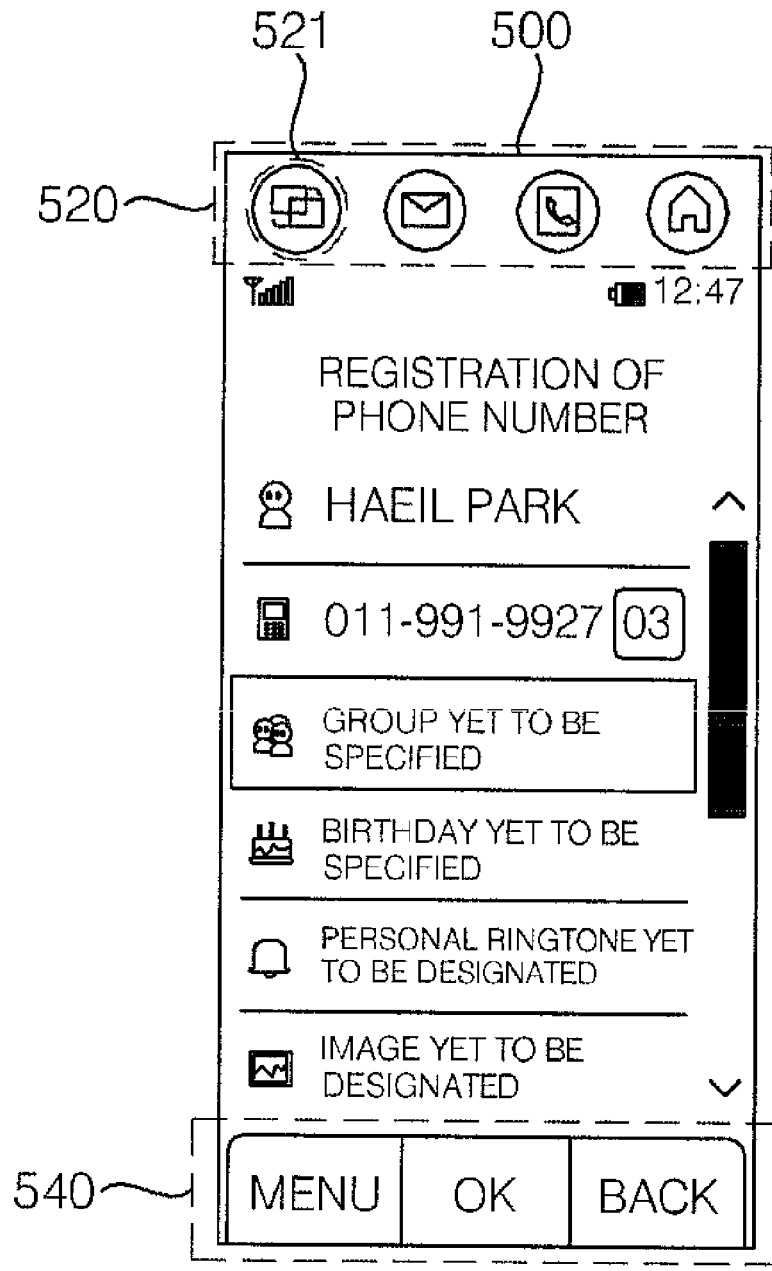

FIG. 7 shows a phonebook screen 500 which may be displayed when a phonebook menu is chosen in idle mode. In this screen, a plurality of menu icons 520 are displayed at the top for choosing, for example, a message menu or a call menu, and a plurality of menu icons 'MENU', 'OK', and 'BACK' 540 may be displayed at the bottom.

Menu icons 520 may include a menu icon 521 for choosing a multitasking menu. The menu icon 521 may correspond to a menu icon 421 shown in FIG. 6 and may represent a different function from the function represented by menu icon 421. Other menu icons 520 different from menu icon 521 may be the same as and may thus represent the same functions as their respective counterparts shown in FIG. 6. That is, menu icon 421 displayed on idle mode screen 400 may be transformed into menu icon 521 and may thus represent a different function from the menu icon previously displayed at this location when the mobile terminal switches from idle mode to another operating mode. Therefore, menu icon 421 displayed on the idle mode screen may be a variable menu icon. In this manner, a menu icon in accordance with one or more of the embodiments described herein may be configured to represent two or more functions according to the operating mode of the mobile terminal.

Figure 8:
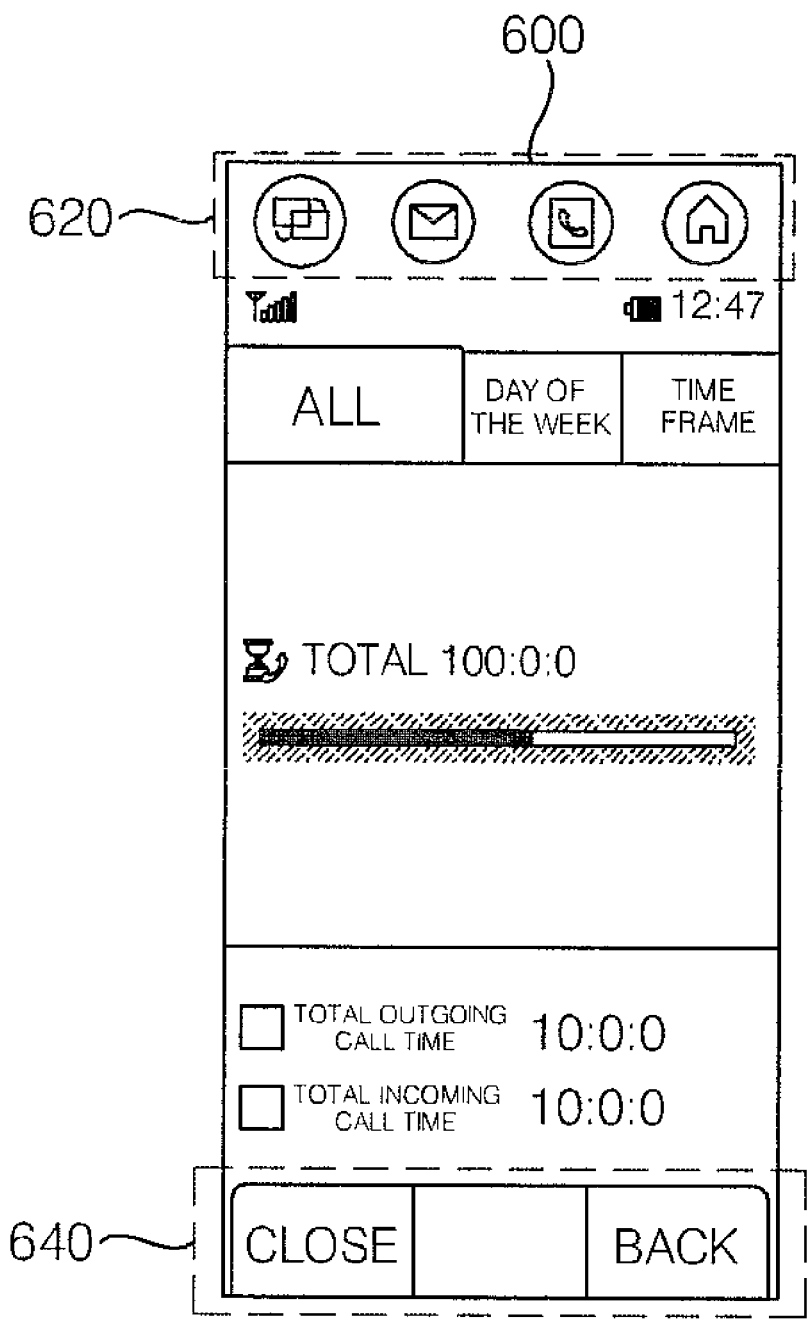

FIG. 8 shows a multimedia play screen 600 for playing a multimedia file such as a moving image file or a music file. In this screen, a plurality of menu icons 620 may be displayed at the top and may be the same as and thus may represent the same functions as the icons shown in respective locations in the screen of FIG. 7. On the other hand, a plurality of menu icons 640 displayed at the bottom of the multimedia play screen may represent functions that correspond to a currently chosen operating mode, and therefore may be different from icons at their respective locations in the screen of FIG. 7.

Figure 9:
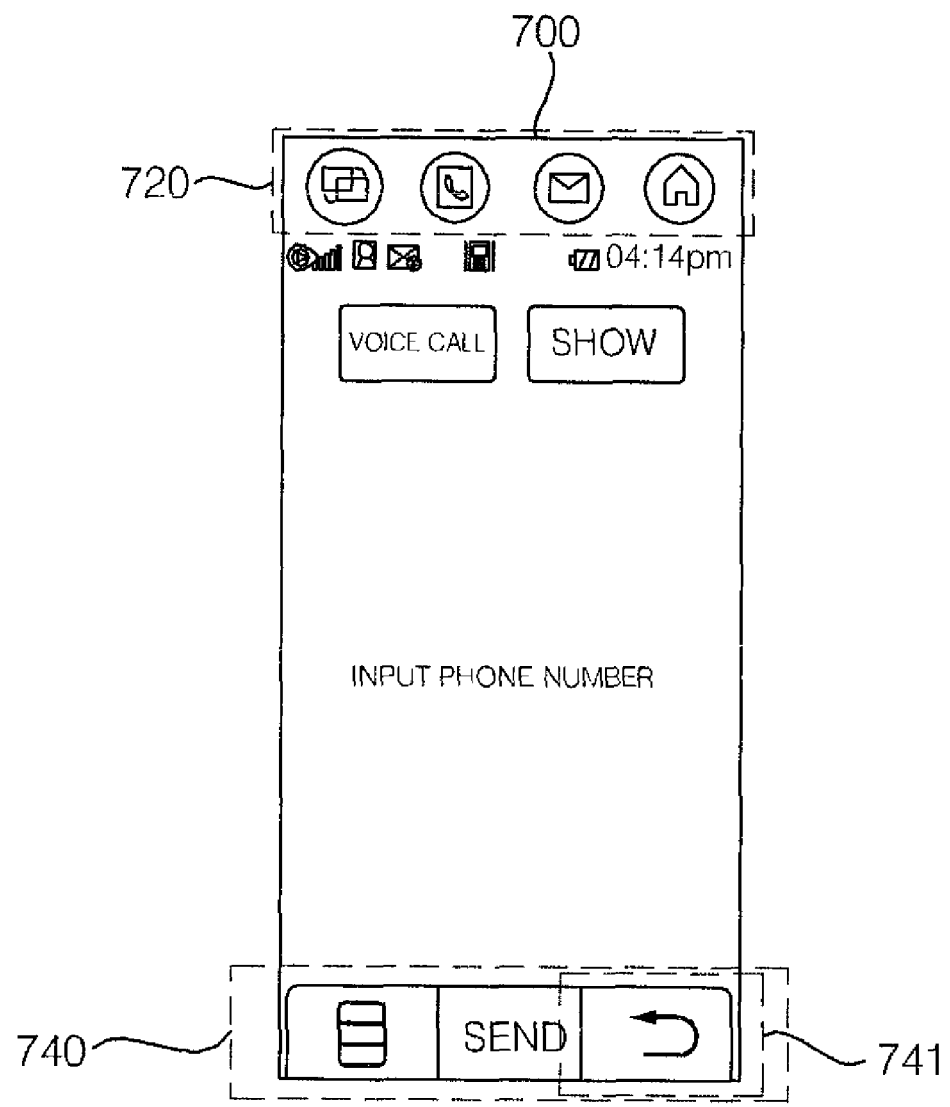
Figure 10:
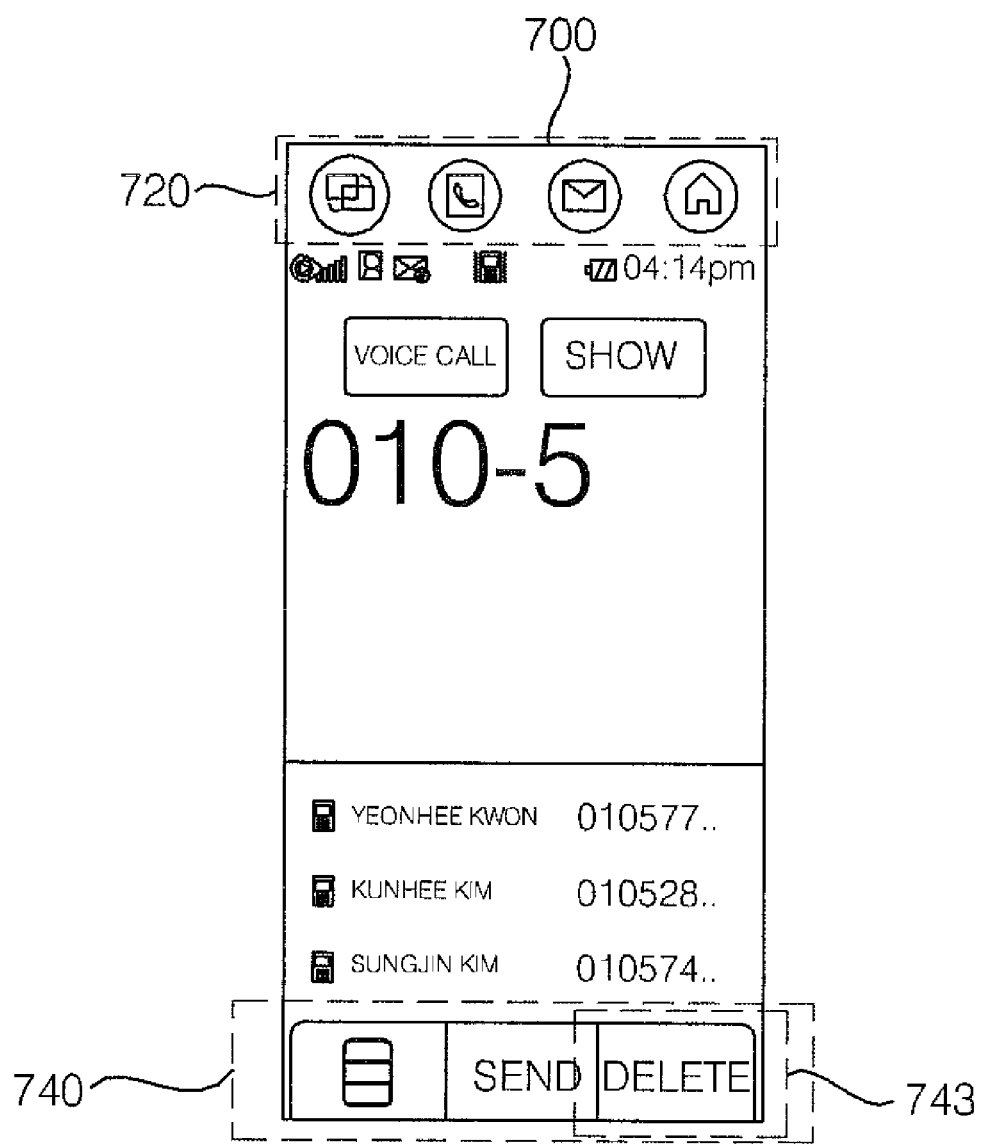

FIGS. 9 and 10 illustrate diagrams for explaining how to use a variable menu icon when a call menu screen 700 is displayed on the screen of the mobile terminal. More specifically, FIG. 9 shows a screen which corresponds to the situation in which the mobile terminal stands by for receiving a phone number input, and FIG. 10 shows a screen which corresponds to the situation in which a series of digits corresponding to part of a phone number are input to the mobile terminal when the call menu screen 700 is displayed.

When the mobile terminal switches from one operating mode to another operating mode, a menu icon 741 for returning to a previous menu may be transformed into a menu icon 'DELETE' 743 for deleting a preceding character. If the input digits are all deleted from the call menu screen shown in FIG. 10, the call menu screen of FIG. 9 may be displayed again on the screen of the mobile terminal. In this manner, it is possible to conveniently configure a menu screen using variable menu icons regardless of whether the operating mode of the mobile terminal changes.

The exemplary embodiment of FIGS. 9 and 10 has been described taking a call menu as an example. However, other variations are possible. For example, the embodiments may be applied to the situation when the operating mode of the mobile terminal switches between or among a mode for creating messages, a mode for checking messages, and/or a mode for checking recent phone records and issuing a request for making a call to the phone numbers of missed calls.

The foregoing embodiments can be implemented in hardware, software, or a combination thereof. For example, in a software implementation, code written on a computer-readable medium can be read by a processor (such as a mobile station modem (MSM)) included in the mobile terminal. The medium may be one capable of being read by any type of recording device in which data is stored. Examples of the computer-readable recording medium include a ROM, a RAM, a CD-ROM, a magnetic tape, a floppy disc, an optical data storage, and a carrier wave (e.g., data transmission through the Internet).

Also, the computer-readable medium can be distributed over or made accessible to a plurality of computer systems connected to a network, so that computer-readable code is written thereto and executed therefrom in a decentralized manner. Functional programs, code, and code segments needed for realizing the present embodiments can be provided in corresponding manner.

In accordance with one embodiment, a mobile terminal is therefore provided which uses one or more variable menu icons capable of being adaptively switched from one function to another function according to the operating mode of the mobile terminal and a method of controlling the mobile terminal.

According to another embodiment, a method of controlling a mobile terminal is provided, where the method includes setting a variable menu icon capable of representing different functions for first and second operating modes; displaying a plurality of menu icons including the variable menu icon during the first operating mode; and if an operating mode of the mobile terminal changes from the first operating mode to the second operating mode, switching the variable menu icon from a function different from its previous function during the first operating mode, while controlling the other menu icons to maintain their previous functions during the first operating mode.

According to another embodiment, a mobile terminal is provided to include a display module configured to display a plurality of menu icons during a first operating mode, the menu icons including at least one variable menu icon; and a controller configured to switch the variable menu icon to a function different from its previous function during the first operating mode while controlling the other menu icons to maintain their previous functions during the first operating mode, if an operating mode of the mobile terminal is switched from the first operating mode to a second operating mode.

According to another embodiment, a computer-readable recording medium is provided having recorded thereon a computer program for executing a method of controlling a mobile terminal, the method including setting a variable menu icon capable of representing different functions for first and second operating modes; displaying a plurality of menu icons including the variable menu icon during the first operating mode; and if an operating mode of the mobile terminal changes from the first operating mode to the second operating mode, switching the variable menu icon from a function different from its previous function during the first operating mode, while controlling the other menu icons to maintain their previous functions during the first operating mode.

In the foregoing embodiments, the term "mobile terminal" may be understood to correspond to a mobile phone, a smart phone, a laptop book computer, a digital broadcast receiver, a personal digital assistant (PDA), a portable multimedia player (PMP), or a navigation device, as well as any other communication device portable or otherwise.

In accordance with one or more of the aforementioned embodiments, it is therefore possible to control operation of a mobile terminal not only using typical menu icons but also by using variable menu icons that are capable of adaptively switching from one function to another function according to the operating mode of the mobile terminal. The variable icons preferably are displayed at the same locations in different screens according to the operating mode of the mobile terminal, but in other embodiments the screen locations may change if desired. It is therefore possible to overcome restrictions on data input methods used in mobile terminals that relate to the size of the display device for mobile terminals and thus to improve the spatial efficiency of mobile terminals.

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a mobile terminal, comprising:
setting a variable menu icon to represent a first operating mode of the mobile terminal and to represent a second operating mode of the mobile terminal;
simultaneously displaying a plurality of icons and the variable menu icon in a fixed display area of the mobile terminal during the first operating mode of the mobile terminal, each of the plurality of icons corresponding to a different function of the mobile terminal; and
receiving a selection of the displayed variable menu icon while the mobile terminal is in the first operating mode;
in response to receiving the selection of the variable menu icon, changing the display of the variable menu icon from a first image at a specific position in the fixed display area to a second image at the specific position in the fixed display area, changing a function of the variable menu icon to a new function different from a previous function of the variable menu icon, and controlling the plurality of icons displayed in the fixed display area to maintain previous functions of the plurality of icons while the mobile terminal is in the second operating mode.

2. The method of claim 1, wherein the variable menu icon is represented by the first image during the first operating mode and by the second image during the second operating mode.

3. The method of claim 1, wherein the setting of the variable menu icon comprises setting the variable menu icon in response to a user command.

4. A mobile terminal comprising:
a display module to simultaneously display a plurality of functional icons and a first menu icon in a fixed display area during a first operating mode of the mobile terminal, and to simultaneously display the plurality of functional icons and a second menu icon in the fixed display area during a second operating mode of the mobile terminal, the displayed second menu icon being different than the displayed first menu icon, wherein in the second operating mode of the mobile terminal the second menu icon is displayed at a same specific position in the fixed display area as the first menu icon is displayed during the first operating mode of the mobile terminal, the first menu icon corresponding to the first operating mode of the mobile terminal and the second menu icon corresponding to the second operating mode of the mobile terminal, and each of the plurality of functional icons corresponds to a different function of the mobile terminal; and
a controller configured to change operation of the mobile terminal from the first operating mode to the second operating mode and to change the display of the first menu icon to the display of the second menu icon in the same specific position in response to receiving a first input corresponding to the displayed first menu icon while the mobile terminal is in the first operating mode, and the controller to display information corresponding to the second operating mode of the mobile terminal in a main display area while the mobile terminal is in the second operating mode, and when the operation of the mobile terminal changes from the first operating mode to the second operating mode, the function of each of the plurality of functional icons is maintained.

5. The mobile terminal of claim 4, further comprising:
a memory configured to store image data for each of the plurality of functional icons and map information between one or more functions of each of the plurality of functional icons and a plurality of operating modes.

6. The mobile terminal of claim 4, wherein the display module includes a touch screen.

7. The mobile terminal of claim 6, wherein, when one of the plurality of functional icons is selected based on a touch input received by the display module, the controller performs an operation corresponding to the selected icon.

8. The mobile terminal of claim 4, wherein the first operating mode is an idle mode of the mobile terminal and the second operating mode is a multitasking mode of the mobile terminal.

9. The mobile terminal of claim 4, wherein in response to receiving a second input corresponding to the displayed second menu icon while the mobile terminal is in the second operating mode, the controller changes the mobile terminal to the first operating mode, wherein changing to the first operating mode includes:
simultaneously displaying the plurality of functional icons and the first menu icon in the fixed display area of the display, wherein the first menu icon is displayed at the same specific position in the fixed display area that previously displayed the second menu icon, and
displaying information corresponding to the first operating mode of the mobile terminal in the main display area of the display.

10. A method for controlling a mobile terminal having a display, the method comprising:
simultaneously displaying a plurality of functional icons and a first menu icon in a fixed display area of the display during a first operating mode of the mobile terminal, wherein the first menu icon is displayed at a specific position in the fixed display area;
receiving a first input corresponding to the displayed first menu icon while the mobile terminal is in the first operating mode;
in response to receiving the first input corresponding to the displayed first menu icon, changing the mobile terminal to a second operating mode, wherein changing the mobile terminal to the second operating mode includes:
simultaneously displaying the plurality of functional icons and a second menu icon in the fixed display area of the display, wherein the second menu icon is displayed at the specific position in the fixed display area of the display,
maintaining previous functions of the plurality of functions icons, wherein a function of the displayed second menu icon is different than a function of the previously-displayed first menu icon, and
displaying information corresponding to the second operating mode of the mobile terminal in a main display area of the display.

11. The method of claim 10, wherein changing the mobile terminal from the first operating mode to the second operating mode includes outputting a sound effect indicating that the function has been changed.

12. The method of claim 10, wherein changing the mobile terminal from the first operating mode to the second operating mode includes outputting a haptic effect indicating that the function has been changed.

13. The method of claim 10, wherein the first operating mode is an idle mode of the mobile terminal and the second operating mode is a multitasking mode of the mobile terminal.

14. The method of claim 10, wherein the first operating mode of the mobile terminal is a mode for waiting for a phone number to be input as part of a call menu and the second operating mode of the mobile terminal is a mode for receiving at least one digit as part of the call menu.

15. The method of claim 10, wherein the first operating mode of the mobile terminal is a mode for creating messages and the second operating mode of the mobile terminal is a mode for checking received messages.

16. The method of claim 10, further comprising, selecting one of the plurality of icons, and performing an operation corresponding to the selected one icon.

17. The method of claim 16, wherein each of the plurality of icons is selected in response to at least one of a touch input or a key input.

18. The method of claim 10, further comprising:
receiving a second input corresponding to the displayed second menu icon while the mobile terminal is in the second operating mode;
in response to receiving the second input corresponding to the displayed second menu icon, changing the mobile terminal to the first operating mode, wherein changing the mobile terminal to the first operating mode includes:
simultaneously displaying the plurality of icons and the first menu icon in the fixed display area of the display, wherein the first menu icon is displayed at the specific position in the fixed display area of the display, and
displaying information corresponding to the first operating mode of the mobile terminal in the main display area of the display.

19. The method of claim 10, wherein simultaneously displaying information corresponding to the second operating mode of the mobile terminal includes displaying a plurality of icons corresponding to the second operating mode of the mobile terminal in the main display area of the display.

\* \* \* \* \*